2,965,512
ZINC PYROPHOSPHATE TREATED SULFIDE PHOSPHORS AND THEIR PREPARATION

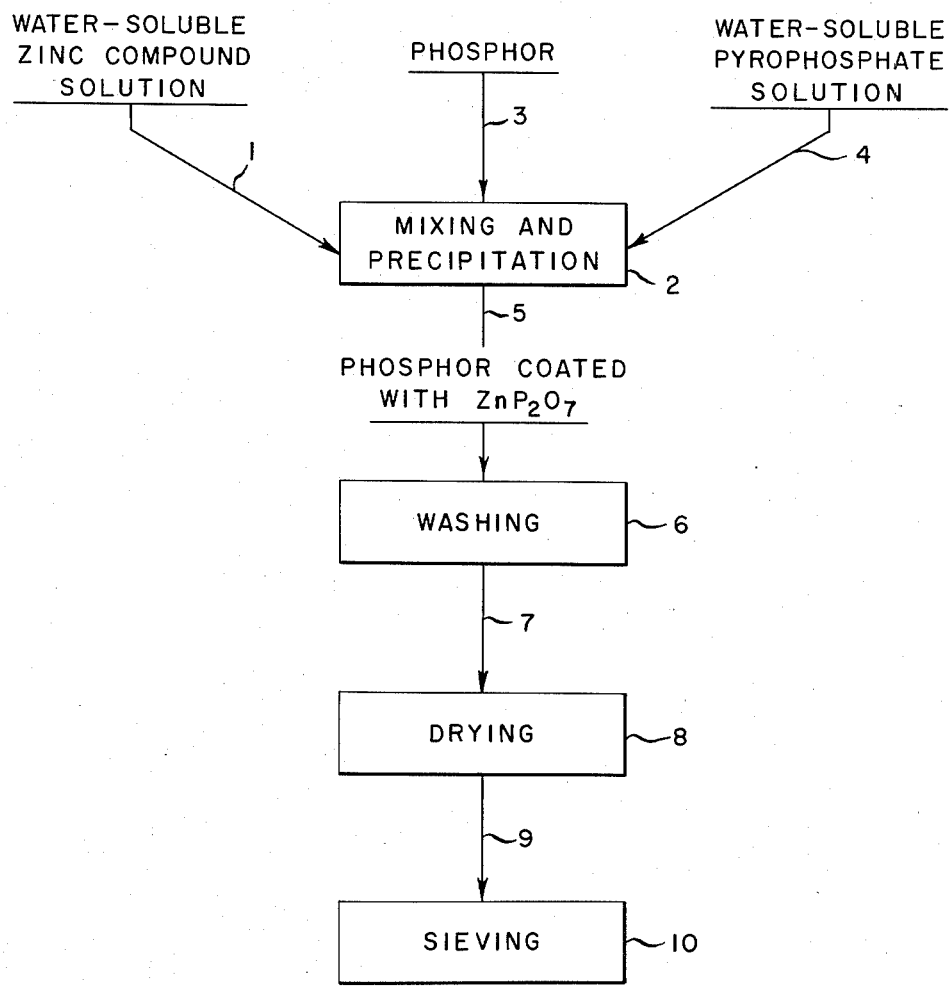

Jacob Quentin Umberger, Holmdel, and John Gustave Lofstrom, Metuchen, N.J., assignors to E. I. du Pont de Nemours and Company, Wilmington, Del., a corporation of Delaware Filed Oct. 30, 1958, Ser. No. 770,595

13 Claims. (Cl. 117—33.5)

The invention relates to improved luminescent materials, particularly luminescent materials of the zinc sulfide type. This invention also relates to improvements in the methods of treating phosphor particles, which particles may be used for making viewing screens for cathode-ray tubes, kinescopes for television, and the like.

Zinc sulfide and zinc cadmium sulfide phosphors are prepared by firing pure zinc sulfide, or a mixture of pure zinc sulfide and cadmium sulfide, with one or more activators such as silver, copper, manganese, or gold and usually a halide flux, at a temperature usually between 500 and 1200° C. Such methods are well known in the art. An important use for such phosphors is in cathode-ray tubes such as are used for black and white and color television. In this and other applications it is desirable that maximum emission brightness be obtained from the phosphor. Various methods have been used in the past to increase the emission brightness of these phosphors. U.S. Patent 2,164,533 issued July 4, 1939, to Leverenz teaches that etching the surface of the phosphor particles with an easily volatilized hydrolyzing or decomposing solution improves luminescent efficiency. A variety of phosphor surface treatments have been employed to improve certain other phosphor properties. U.S. Patent 2,697,668 issued December 21, 1954, to Crosby and Markoski teaches that adherence of the phosphor to the transparent face of cathode-ray tubes is improved by coating on the phosphor crystals a gelatinous phosphate precipitate, from soluble reagents such as trisodium phosphate and solutions of cations which form insoluble phosphates. U.S. Patent 2,704,726 issued March 22, 1955, to Markoski teaches that the tendency of phosphor particles to aggregate is reduced by coating the surface of the particles with zinc metasilicate. According to U.S. Patent 2,758,941, issued August 14, 1956, to Crosby and Edwards, the "wet adherence" of the phosphor particles to the face of the cathode-ray tube is improved by treating the surface of the particles with calcium hydroxy phosphate. These references, however, do not disclose coating of phosphor particles with zinc pyrophosphate or conditions whereby such coatings would result.

An object of the present invention is to provide an improved method for treating phosphor particles which may be used for making viewing screens for cathode-ray tubes, kinescopes for television, and the like. Another object of this invention is to provide an improved method for treating phosphor particles to improve their emission brightness characteristics. A further object of this invention is to provide an improved method for treating zinc sulfide and zinc cadmium sulfide phosphors to improve their emission brightness characteristics. A still further object of this invention is to provide luminescent materials having improved emission brightness characteristics. Other objects will appear hereinafter.

According to the present invention, there are provided improved luminescent materials comprising phosphor particles and more particularly zinc sulfide, cadmium sulfide and zinc cadmium sulfide particles coated with 0.1 to 3 percent by weight of zinc pyrophosphate based on the weight of the uncoated particles. These coated phosphors can be made in accordance with the invention by precipitating zinc pyrophosphate onto the phosphor particles in an aqueous solution.

In a specific aspect of the invention zinc sulfide, zinc cadmium sulfide or cadmium sulfide phosphor particles including such phosphors activated by various metal or metal compounds are slurried in an aqueous solution containing a soluble zinc compound and a soluble pyrophosphate compound, which have been added in a manner to effect precipitation of zinc pyrophosphate in the presence of the phosphor. The amounts of the zinc and pyrophosphate compounds added are adjusted so that the amount of zinc pyrophosphate precipitated is from 0.1 to about 3 percent based on the weight of phosphor. The treated phosphor can then be washed, dried and sieved prior to use.

It has been found that an unexpected increase in emission brightness, under cathode-ray excitation, of zinc sulfide type phosphors can be obtained by treating the phosphor with zinc pyrophosphate. More specifically, phosphors which have been given prior treatment to improve physical properties, such as body color, can be treated with zinc pyrophosphate to increase the emission brightness.

A zinc sulfide type phosphor, preferably a blue-emitting zinc sulfide-silver-activated phosphor, which has been treated to improve body color with an acid solution containing 2 percent sodium metabisulfite and 20 percent sodium thiosulfate, as described in Example II of this application, but which may instead be treated with other non-basic complexers, e.g., from the class of thiourea, thiocyanate, iodides and bromides, is slurried for approximately 10 minutes with a zinc solution and a pyrophosphate solution in such amounts that the zinc pyrophosphate precipitated corresponds to 0.1 to about 3 percent, preferably 0.7 percent by weight based on the weight of phosphor. The mixture can be washed several times with water on a filter, dried and sieved. The product thus obtained exhibits improved brightness under cathode-ray excitation, being approximately 10 to 30 percent brighter than untreated phosphors.

The zinc sulfide type phosphors are prepared by firing silver-actuated pure zinc sulfide with or without pure cadmium sulfide by procedures known in the art. The other raw materials are of "reagent" grade and are commercially available.

Referring now to the drawing which illustrates a process flow-sheet of the invention, the water-soluble zinc compound solution can be added through line 1 to the mixing and precipitation zone 2. The latter can be any suitable receptacle or container that provides for mixing and withdrawal of a precipitate. Next, the phosphor and the water-soluble pyrophosphate solution can be added through lines 3 and 4 respectively. The above order of addition is not mandatory and the pyrophosphate solution can be introduced first with subsequent addition of the zinc compound solution. It is further possible that a nearly simultaneous addition of all three components could be effected. Any manner of addition known in the art is satisfactory that permits the precipitation of the zinc pyrophosphate to take place on the phosphor particles in the mixing and precipitation zone 2. The phosphor coated with zinc pyrophosphate is then withdrawn through line 5 and introduced to the washing zone 6. The coated phosphor is washed with water by suitable means and is then transferred through line 7 to the drying zone 8 where the remaining water is removed. The dried phosphor is then introduced through line 9 to the sieving zone 10 where the coated phosphor particles can be classified. The lines of the drawing referred to above serve merely to indicate direction of flow and are not to be strictly construed to represent only pipes or tubes. Any suitable means of addition or withdrawal of the various materials referred to can be used.

EXAMPLE I

A yellow-emitting silver-copper-activated zinc cadmium sulfide phosphor was made by calcining at 840° C. a mixture of 61.6 mole percent ZnS and 38.4 mole percent CdS with $AgNO_3$ and $CuCl_2$ to give 23 parts Ag and 0.09 part Cu, per million, by weight. This material was reheated with magnesium chloride to a temperature of 210° C. for 18 hours. The phosphor thus prepared was treated with a 0.1 molar solution of zinc sulfate (1 ml. zinc sulfate to 1 g. phosphor) by stirring the phosphor in the zinc sulfate solution to effect thorough or complete wetting of the surface of the phosphor particles, and the phosphor was filtered. The phosphor was then placed on a filter and, with vacuum applied, washed. The phosphor was then dried and sieved. Three portions of this phosphor were stirred for 10 minutes with 0.02 molar solutions of zinc sulfate to which were added, while stirring, portions of 0.02 molar solution of sodium pyrophosphate stoichiometrically equivalent to 0.3, 0.5 and 0.7 percent $Zn_2P_2O_7$, respectively by weight of phosphor. The solutions were filtered-off, and the phosphors washed on the filter with water, dried and then sieved through a 325 mesh sieve. The brightness of the treated phosphors was determined under cathode-ray excitation using an untreated portion of the phosphor as the control for relative brightness (100 in arbitrary units) with the results indicated in Table I.

*Table I*

| Treatment | Relative Brightness (arbitrary units) |
| --- | --- |
| None | 100 |
| 0.3% $Zn_2P_2O_7$ | 104 |
| 0.5% $Zn_2P_2O_7$ | 119 |
| 0.7% $Zn_2P_2O_7$ | 119 |

EXAMPLE II

A blue-emitting silver-activated zinc sulfide phosphor was prepared by calcining pure zinc sulfide with a silver compound ($AgNO_3$) equivalent to 0.028% silver based on the weight of zinc sulfide. The material was allowed to cool, was washed with distilled water, and was then reheated with magnesium chloride at 210° C. for 18 hours. The phosphor thus prepared was slurried with a treating solution of water containing 20 percent sodium thiosulfate and 2 percent sodium metabisulfite. Glacial acetic acid was added slowly, with stirring, until a pH of about 4 was obtained in the slurry. Stirring was continued for 1 hour, the acid thiosulfate solution filtered off, and the phosphor washed with pure water and dried. The phosphor was observed to be white; surface discoloration had been removed. Two portions of the phosphor were then treated respectively with zinc and pyrophosphate solutions equivalent to 0.7 and 1.5 percent zinc pyrophosphate prepared as described in Example I. The brightness under cathode-ray excitation was determined as described in Example I and the results indicated in Table II, using an untreated portion of the phosphor as a control.

*Table II*

| Treatment | Relative Brightness (arbitrary units) |
| --- | --- |
| None | 100 |
| 0.7% $Zn_2P_2O_7$ | 131 |
| 1.5% $Zn_2P_2O_7$ | 112 |

EXAMPLE III

A blue-emitting silver-activated zinc sulfide phosphor was prepared by calcining pure zinc sulfide with a silver compound ($AgNO_3$) equivalent to 0.021% silver based on the weight of the zinc sulfide. The material was allowed to cool and was washed with distilled water. The phosphor was then recalcined in a nitrogen atmosphere at 900° C. A portion of the phosphor was then stirred with two liters of distilled water and 100 ml. of a 0.35 molar solution of zinc sulfate (per pound of phosphor). Fifty ml. of a 0.22 molar solution of sodium pyrophosphate (per pound of phosphor) was then added with stirring and after 2 minutes was filtered, washed, dried and sieved as described in Example I. These quantities correspond to 0.7 percent zinc pyrophosphate, based on the weight of the zinc sulfide, with an excess of 55 percent zinc sulfate added over the stoichiometric amount required. The cathode-ray brightness, in arbitrary units, of the portion treated with zinc pyrophosphate was 111 compared to a brightness of 100 for the untreated control portion.

EXAMPLE IV

Example III was repeated except that the phosphor described therein was not recalcined. The resultant phosphor was tested for brightness under cathode-ray excitation with comparable results being obtained.

The invention process is a simple process which has been found to improve the brightness of zinc sulfide type phosphors under cathode-ray excitation by approximately 10 to 30 percent. Satisfactory treatment results have been obtained using any zinc sulfide, silver-activated phosphor. It has been found, however, for undetermined reasons, that particularly good results have been obtained when recalcined, magnesium chloride rebaked zinc sulfide type phosphors or zinc sulfide type phosphors previously washed with an acid solution of a complexing agent, e.g., a bromide salt or an agent selected from the class consisting of thiosulfate, thiourea, thiocyanate and iodide as taught by assignee's Umberger U.S. application Ser. No. 672,567, filed July 18, 1957, are treated. The zinc pyrophosphate treatment solution can contain an amount of 0.1 to about 3 percent by weight zinc pyrophosphate based on the zinc sulfide present, preferably 0.7 percent by weight. It is not necessary, however, that the solution of the zinc compound and pyrophosphate compound yield a stoichiometric equivalent amount. An excess of zinc compound or pyrophosphate may be used, consistent with the formation of zinc pyrophosphate precipitate, and still result in improved brightness.

It should be noted that this invention is not limited to the use of zinc sulfate solutions and sodium pyrophosphate solutions. Examples of other soluble zinc compounds are: zinc chloride, zinc nitrate, zinc acetate, etc. Another example of a soluble pyrophosphate is potassium pyrophosphate.

The phosphor must be thoroughly wet by the treatment solution. Generally this is done by slurrying the phosphor in one of the treatment solutions while adding the other treating solution, but other mixing procedures known in the art may be utilized. The phosphor may be slurried for about 10 minutes, but this period of time is not critical and can be a longer or shorter period. The quantity of slurry liquid present also is not critical. The treated phosphor should be washed with water, dried and sieved, but these operations are not a unique part of the process and are well known to those versed in the art.

The treatment improves the brightness of zinc sulfide type phosphors. The improved phosphors may be used alone, or in combination with one another to produce a white-emitting screen, or in connection with phosphors of other types. The phosphors may also be used in other cathode-ray tubes, kinescopes for television, and the like.

The instant treatment increases the cathode-ray brightness by approximately 10 to 30 percent. In addition, the treatment is non-toxic, inexpensive and easy to carry out.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A luminescent material comprising a metal sulfide phosphor coated with from 0.1 to 3 percent of zinc pyrophosphate based on the weight of the phosphor.

2. Material according to claim 1 wherein the phosphor is a silver-activated zinc sulfide phosphor.

3. Material according to claim 1 wherein the phosphor is a silver-activated zinc cadmium sulfide phosphor.

4. A luminescent material comprising a phosphor selected from the class consisting of zinc sulfide, cadmium sulfide and zinc cadmium sulfide phosphor particles coated with from 0.1 to 3 percent of zinc pyrophosphate based on the weight of the phosphor.

5. A luminescent material showing improved emission brightness comprising a blue-emitting silver-activated zinc sulfide phosphor coated with about 0.7 percent of zinc pyrophosphate based on the weight of the phosphor.

6. Material according to claim 5 wherein prior to coating, the phosphor has been pretreated with an acid solution containing sodium metabisulfite and sodium thiosulfate.

7. A process which comprises mixing a phosphor with an aqueous solution of a water soluble zinc compound and an aqueous solution of a water soluble pyrophosphate so as to effect a precipitation in the presence of the phosphor of from 0.1 to 3.0 percent of zinc pyrophosphate based on the weight of the phosphor.

8. A process according to claim 7 wherein the phosphor is one selected from the class consisting of zinc sulfide, cadmium sulfide and zinc cadmium sulfide phosphors.

9. In a method for preparing luminescent materials the step comprising mixing a silver-activated phosphor of the class consisting of zinc sulfide, cadmium sulfide and zinc cadmium sulfide phosphors with an aqueous solution of a water soluble zinc compound and an aqueous solution of a water soluble pyrophosphate so as to effect a precipitation in the presence of the phosphor of from 0.1 to 3.0 percent of zinc pyrophosphate based on the weight of the phosphor.

10. In a method for preparing luminescent materials the steps comprising slurrying a silver-activated phosphor of the class consisting of zinc sulfide, cadmium sulfide and zinc cadmium sulfide phosphors in an aqueous solution of a water soluble zinc compound and adding thereto an aqueous solution of a water soluble pyrophosphate, the amounts and concentrations of said solutions so selected as to effect a precipitation in the presence of the phosphor of from 0.1 to 3.0 percent of zinc pyrophosphate based on the weight of the phosphor.

11. In a method for preparing luminescent materials the steps comprising slurrying a silver-activated phosphor of the class consisting of zinc sulfide, cadmium sulfide and zinc cadmium sulfide phosphors in an aqueous solution of a water soluble pyrophosphate and adding thereto an aqueous solution of a water soluble zinc compound, the amounts and concentrations of said solutions so selected as to effect a precipitation in the presence of the phosphor of from 0.1 to 3.0 percent of zinc pyrophosphate based on the weight of the phosphor.

12. In a method for treating phosphor particles the steps comprising slurrying a blue-emitting silver-activated zinc sulfide phosphor in an aqueous solution of a water soluble zinc compound and adding thereto an aqueous solution of a water soluble pyrophosphate, the amounts and concentrations of said solutions so selected as to effect a precipitation in intimate admixture with the phosphor of about 0.7 percent of zinc pyrophosphate based on the weight of the phosphor, the treated phosphor being washed, dried, and sieved prior to use.

13. A method according to claim 12 wherein the phosphor has been pretreated with an acid solution containing sodium metabisulfite and sodium thiosulfate.

References Cited in the file of this patent

UNITED STATES PATENTS

| | | |
|---|---|---|
| 2,252,590 | Wolfson | Aug. 12, 1941 |
| 2,697,668 | Crosby et al. | Dec. 21, 1954 |
| 2,704,726 | Markoski | Mar. 22, 1955 |
| 2,743,238 | Hunt | Apr. 24, 1956 |
| 2,758,941 | Crosby et al. | Aug. 14, 1956 |
| 2,821,509 | Hunt | Jan. 28, 1958 |